US012729565B2

(12) United States Patent
Millan et al.

(10) Patent No.: US 12,729,565 B2
(45) Date of Patent: Sep. 8, 2026

(54) CABLE INTERLOCK SYSTEM AND RELATED METHODS

(71) Applicant: Modus Furniture International Inc., Los Angeles, CA (US)

(72) Inventors: Victor Millan, Gardena, CA (US); Liz Nguyen, Ho Chi Minh City (VN); Jonathan Richey, Los Angeles, CA (US); Sara Tang, Foshan (CN); Brett Williams, Ho Chi Minh City (VN)

(73) Assignee: Modus Furniture International Inc., Los Angeles, CA (US)

(*) Notice: Subject to any disclaimer, the term of this patent is extended or adjusted under 35 U.S.C. 154(b) by 144 days.

(21) Appl. No.: 18/676,245

(22) Filed: May 28, 2024

(65) Prior Publication Data

US 2024/0392608 A1 Nov. 28, 2024

Related U.S. Application Data

(60) Provisional application No. 63/469,003, filed on May 25, 2023.

(51) Int. Cl.
*E05B 65/00* (2006.01)
*E05B 65/466* (2017.01)

(52) U.S. Cl.
CPC .................................. *E05B 65/466* (2013.01)

(58) Field of Classification Search
CPC ......... E05B 65/466; E05B 65/462–464; A47B 88/70; A47B 2088/76; A47B 2097/008
USPC ...................... 312/221, 217, 216, 273, 319.4
See application file for complete search history.

(56) References Cited

U.S. PATENT DOCUMENTS

| | | | | |
|---|---|---|---|---|
| 1,238,514 A * | 8/1917 | Hartbeck | ............. | A47B 88/467 109/47 |
| 3,361,509 A * | 1/1968 | Levenberg | ............. | A47B 88/70 312/273 |
| 2010/0295433 A1* | 11/2010 | Randall | ................. | E05B 65/466 312/333 |
| 2019/0069673 A1* | 3/2019 | Nelson | ................... | A47B 88/75 |
| 2024/0122344 A1* | 4/2024 | Nisley | .................... | A47B 88/50 |

FOREIGN PATENT DOCUMENTS

| | | | | |
|---|---|---|---|---|
| AU | 709749 B2 * | 9/1999 | | |
| AU | 2009202679 A1 * | 1/2011 | ............. | A47B 88/70 |
| CN | 114698961 A * | 7/2022 | ............. | A47B 88/50 |
| DE | 20118675 U1 * | 4/2002 | ............. | A47B 88/70 |
| DE | 10212376 B4 * | 2/2004 | ........... | E05B 65/466 |
| DE | 102004021105 A1 * | 11/2005 | ............. | A47B 88/70 |
| EP | 1149971 A1 * | 10/2001 | ........... | E05B 65/466 |

(Continued)

*Primary Examiner* — Janet M Wilkens
(74) *Attorney, Agent, or Firm* — CP LAW GROUP PC; Cy Bates

(57) ABSTRACT

A cable interlock system is used to regulate extension of a plurality of drawers in a furniture to prevent tipping over. The cable interlock system includes a cable coupled to the plurality of drawers and a furniture body with an amount of slack to prevent over extension of the plurality of drawers. One or more furniture threading points is disposed on the furniture body with the cable extending therethrough. A first anchor point is disposed on one of the furniture body or one of the plurality of drawers. A cable first end of the cable is coupled to the first anchor point.

20 Claims, 14 Drawing Sheets

(56) References Cited

FOREIGN PATENT DOCUMENTS

| | | | | | |
|---|---|---|---|---|---|
| EP | 2053187 | A1 * | 4/2009 | ........... | E05B 65/464 |
| GB | 2079834 | A * | 1/1982 | ............. | A47B 88/70 |
| GB | 2377217 | A * | 1/2003 | ........... | E05B 65/466 |
| KR | 20220070933 | A * | 5/2022 | ............. | A47B 67/04 |
| WO | WO-0074525 | A1 * | 12/2000 | ............. | A47B 47/05 |
| WO | WO-2005040530 | A1 * | 5/2005 | ........... | E05B 47/026 |
| WO | WO-2022192851 | A1 * | 9/2022 | ............. | A47B 97/00 |
| WO | WO-2024128956 | A1 * | 6/2024 | ........... | E05B 65/466 |

* cited by examiner

CABLE INTERLOCK SYSTEM AND RELATED METHODS

CROSS-REFERENCE TO RELATED APPLICATIONS

This application claims benefit of priority with U.S. Provisional Application Ser. No. 63/469,003, filed May 25, 2023; the entire contents of which are hereby incorporated by reference.

BACKGROUND

Field of the Invention

This disclosure relates to a furniture interlock system, and more particularly to a cable interlock system to regulate extension of drawers.

Description of the Related Art

Drawer interlocks have been common in commercial office furniture, such as file cabinets, to regulate the simultaneous operation of multiple drawers to prevent furniture from tipping over. Generally, these drawer interlocks are assembled on-site with drawer slides. The conventional systems use catches, typically installed on sides of the drawers or integrated into the slides, to regulate the simultaneous operation. When one drawer is open, the catch engages to prevent other drawers from opening at the same time.

New federal furniture tip-over regulations have made drawer interlock system more important with residential furniture. However, the conventional interlock systems are not suitable for factory-assembled residential furniture. Factory-assembled residential furniture is subjected to significant impacts during transit, as well as changes in furniture material (expanding, contracting, twisting, and warping) that can cause installed conventional interlock systems to become misaligned and no longer function. This reduces furniture utility and safety.

There is a need for an interlock system that is optimized for residential furniture that is resistant to impacts and change in furniture shape.

SUMMARY

A cable interlock system configured to regulate extension of drawers piece of a furniture is disclosed, the cable interlock system comprises a cable having cable first end and a cable second end. The cable first end and the cable second end are each secured to the furniture at one of a furniture body or a drawer of the piece of furniture. The cable first end is secured at a first anchor point and the cable second end is secured at a second anchor point. In some embodiments, the first anchor point and the second anchor point comprise a same location. In other embodiments the first and second anchor points comprise separate locations. The furniture comprises a plurality of drawers, each of the plurality of drawers comprises a plurality of walls wherein at least one of the plurality of walls of each of the plurality of drawers comprises a drawer opening, the first anchor point, the second anchor point, or a combination thereof. One or more furniture openings are disposed on the furniture body. The cable is threaded through each of the drawer openings forming a drawer threading point. The cable is further threaded through each of the furniture openings forming a furniture threading point. The cable further comprises a cable slack having sufficient slack so as to regulate the extension of each of the plurality of drawers. In some embodiments, the cable slack is configured to allow a single drawer of the plurality of drawers to fully open while preventing two drawers from fully opening simultaneously. The prevention of two drawers opened at the same time causes one of the drawers to retract to allow the other drawer to fully open.

The cable interlock system can be designed to allow different drawers to extend at different amounts depending on placement of each of the drawer threading points, the furniture threading points, and the first and second anchor points. Advantages of the cable interlock system include an interlock system that is more resilient and less prone to malfunction compared to conventional interlock systems. Furthermore, it can be applied to almost any furniture with minimal modifications. The cable interlock system does not require specialized drawer slides or other complex components. The cable interlock system can be utilized as a drawer stopper of the furniture. The cable interlock system can prevent drawers from accidentally be pulled all the way out of the furniture body. The cable interlock system can be especially advantageous with furniture without slides or that have slides without stoppers.

BRIEF DESCRIPTION OF THE DRAWINGS

Other features, combinations, and embodiments will be appreciated by one having the ordinary level of skill in the art of furniture and accessories upon a thorough review of the following details and descriptions, particularly when reviewed in conjunction with the drawings, wherein.

DETAILED DESCRIPTION

Figure 1:
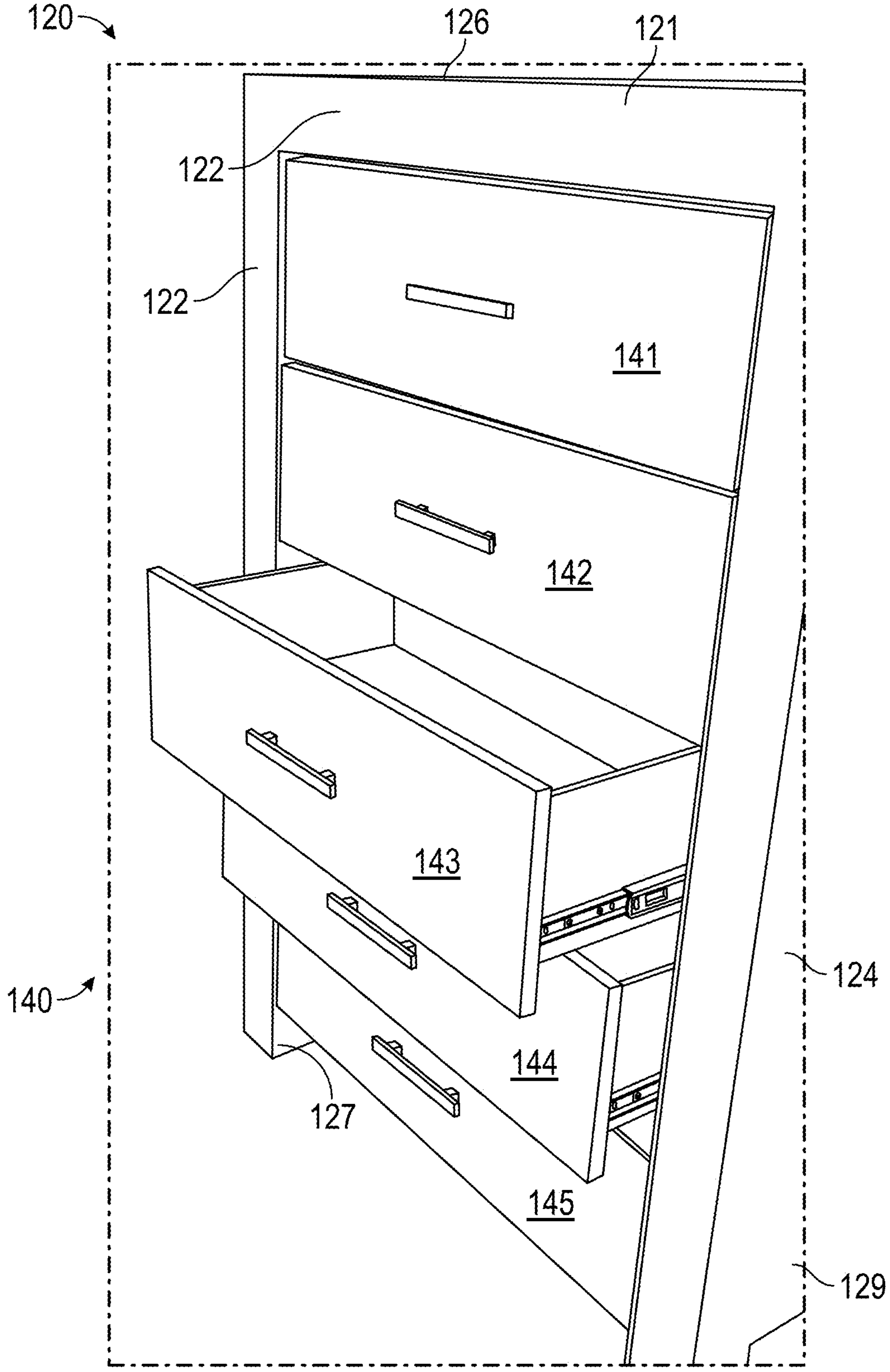
FIG. 1 shows a front view of a piece of furniture having a cable interlock system integrated therein in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "plurality of drawers" means two or more drawers assembled with a piece of furniture. The plurality of drawers may comprise all drawers of the furniture or may comprise a subset of all drawers of the furniture.

The term "cable" means any elongated flexible material.

Unless explicitly defined herein, terms are to be construed in accordance with the plain and ordinary meaning as would be appreciated by one having skill in the art.

General Description of Embodiments

In one general embodiment, a cable interlock system is disclosed. The system comprises a furniture body configured to receive a plurality of drawers. The drawers comprise a drawer back side and a drawer front side opposite the drawer back side. The furniture body comprises a furniture front side, a furniture back side opposite the furniture front side, a furniture bottom side, and a furniture interior. The furniture body further comprises one or more furniture threading points disposed on the furniture interior, and a plurality of furniture apertures disposed on the furniture front side configured to receive the plurality of drawers. A first anchor point is disposed on one of the furniture body or one of the plurality of drawers. A cable having a cable first end and a cable second end is configured to extend through the one or more threading points. The cable first end is coupled to the first anchor point.

In some embodiments, the cable may further comprise a cable slack having a sufficient slack configured to regulate extension of the plurality of drawers. In some embodiments, at least one of the plurality of drawers may be configured to open to a full outward extension.

In some embodiments system comprises a single anchor point such that the cable second end may be coupled to the first anchor point.

In some embodiments, the system may further comprise a second anchor point disposed on one of the furniture body or one of the plurality of drawers, wherein the cable second end is coupled to the second anchor point. The first anchor point and the second anchor point may each be disposed on the furniture back side.

In some embodiments, the system may further comprise a cable weight coupled to the cable first end. The cable weight may translate along a weight guide.

In some embodiments, at least one of the cable first end and the cable second end may be coupled to a cable retracting reel.

In some embodiments, one or more of the plurality of drawers may comprise a drawer threading point wherein the cable is configured to extend through each of the drawer threading points.

In some embodiments, each of the plurality of drawers may comprise the drawer threading point.

In some embodiments, one or more of the drawer threading points may comprise a pulley coupled to a corresponding drawer.

In some embodiments, one or more of the drawer threading points may comprise two apertures disposed on a corresponding drawer.

In some embodiments, one or more of the drawer threading points may comprise a hook coupled to a corresponding drawer. The hook may further comprise a spring-loaded gate.

In some embodiments, at least one of the plurality of drawers may comprise a plurality of the drawer threading points to regulate drawer extension.

In some embodiments, each of the drawer threading points and each of the one or more furniture threading points may be in vertical alignment relative to the furniture bottom side.

In some embodiments, each of the one or more drawer threading points may be disposed on the drawer back side.

In some embodiments, the cable may comprise a plurality of smaller cables connected in a series using intermediate couplings for preventing twist in said cable.

In some embodiments, the cable may further comprise a synthetic polymer sheath surrounding a synthetic fiber core.

In some embodiments, the first anchor point may be disposed on the furniture interior of the furniture body.

In some embodiments, the system may further comprise an interlock release mechanism having an interlock release cover disposed at the furniture back side, the interlock release cover configured to provide access to the furniture interior. The interlock release mechanism may further comprise a leader cord attached to the cable to create sufficient cable slack to remove one of the plurality of drawers.

In some embodiments, one or more of the plurality of drawers comprises an access cutout disposed on a back side of the drawer.

In some embodiments, the plurality of drawers may form a single column wherein a single cable interlock system is configured to regulate extension of the drawers. In other embodiments, the plurality of drawers may form a plurality of columns wherein a plurality of independent cable interlock systems is configured to regulate the plurality of drawers with each of the plurality of columns comprising one of the independent cable interlock systems. In yet other embodiments, the plurality of drawers may form a plurality of columns wherein a single interlock system is configured to regulate the plurality of columns.

In another general embodiment, a cable interlock system is disclosed. The cable interlock system comprises a plurality of drawers, each of the plurality of drawers having a drawer back side and a drawer front side opposite the drawer back side, wherein one or more of the plurality of drawers comprises a drawer threading point. The cable interlock system further comprises a furniture body comprising a furniture front side, a furniture back side opposite the furniture front side, a furniture bottom side, and a furniture interior. One or more furniture threading points are disposed on the furniture interior, and a plurality of furniture apertures disposed on the furniture front side configured to receive the plurality of drawers. A first anchor point is disposed on one of the furniture body or one of the plurality of drawers, and a second anchor point disposed on one of the furniture body or one of the plurality of drawers. A cable having a cable first end and a cable second end wherein the cable first end is coupled to the first anchor point, the cable second end is coupled to the second anchor point, and the cable is configured to extend through each of the drawer threading points and the one or more furniture threading points.

In some embodiments, the cable may further comprise a cable slack having a sufficient slack configured to regulate extension of the plurality of drawers. In some embodiments at least one of the plurality of drawers may be configured to open to a full outward extension.

In some embodiments, the first anchor point and the second anchor point may each be disposed on the furniture back side.

In some embodiments, the second anchor point may be disposed vertically below each of the drawer threading points and each of the one or more furniture threading points, and the first anchor point may be disposed vertically above each of the drawer threading points and each of the one or more furniture threading points.

In some embodiments, each of the plurality of drawers may comprise at least one of the first anchor point, the second anchor point, or the drawer threading point.

In some embodiments, the system may further comprise a cable weight coupled to the cable first end. The cable weight may translate along a weight guide. Translation of the cable weight may be substantially vertical.

In some embodiments, each of the plurality of drawers may comprise the drawer threading point.

In some embodiments, one or more of the drawer threading points may comprise a hook coupled to a corresponding drawer. The hook may further comprise a spring-loaded gate for easy detachment of the cable.

In some embodiments, each of the drawer threading points and each of the one or more furniture threading points are in vertical alignment relative to the furniture bottom side.

In some embodiments, each of the drawer threading points may form a first collinear alignment when the plurality of drawers is in a closed state. The first anchor point, the second anchor point, and the one or more furniture threading points disposed on the furniture body may form a second collinear alignment. The first collinear alignment may parallel to the second collinear alignment. The first collinear alignment may comprise a horizontal offset from the second collinear alignment.

In some embodiments, each of the one or more drawer threading points is disposed on the drawer back side.

In some embodiments, the cable may comprise a plurality of smaller cables connected in a series using intermediate couplings for preventing twist in said cable.

In some embodiments, the cable may further comprise a synthetic polymer sheath surrounding a synthetic fiber core.

In some embodiments, the first anchor point may be disposed on the furniture interior of the furniture body.

In some embodiments, the system may further comprise an interlock release mechanism having an interlock release cover disposed at the furniture back side, the interlock release cover configured to provide access to the furniture interior. The interlock release mechanism may further comprise a leader cord attached to the cable to create sufficient cable slack to remove one of the plurality of drawers.

In some embodiments, one or more of the plurality of drawers comprises an access cutout disposed on a back side of the drawer.

In some embodiments, the plurality of drawers may form a single column wherein a single cable interlock system is configured to regulate extension of the drawers. In other embodiments, the plurality of drawers may form a plurality of columns wherein a plurality of independent cable interlock systems is configured to regulate the plurality of drawers with each of the plurality of columns comprising one of the independent cable interlock systems. In yet other embodiments, the plurality of drawers may form a plurality of columns wherein a single interlock system is configured to regulate the plurality of columns.

In another general embodiment, a cable interlock system is disclosed. The cable interlock system comprises a plurality of drawers, each of the plurality of drawers comprises a drawer back side and a drawer front side opposite the drawer back side, wherein each of the plurality of drawers comprises a drawer threading point at the drawer back side. The cable interlock system further comprises a furniture body comprising a furniture front side, a furniture back side opposite the furniture front side, a furniture bottom side, and a furniture interior. A first anchor point is disposed on the furniture interior at the furniture back side, and a second anchor point is disposed on the furniture interior at the furniture back side. One or more furniture threading points are disposed on the furniture interior, and a plurality of furniture apertures disposed on the furniture front side configured to receive the plurality of drawers. The first anchor point is disposed vertically above each of the drawer threading points and each of the one or more furniture threading points, and the second anchor point is disposed vertically above each of the drawer threading points and each of the one or more furniture threading points. The cable interlock system further comprises a cable having a cable first end and a cable second end. The cable first end is coupled to the first anchor point, and the cable second end is coupled to the second anchor point. The cable is configured to extend through each of the drawer threading points and the one or more furniture threading points. The cable interlock system further comprises a cable weight coupled to the cable first end, wherein the cable weight translates along a weight guide. A first collinear alignment formed by each of the drawer threading points when the plurality of drawers is in a closed state, and a second collinear alignment formed by each of the first anchor point, the second anchor point, and the one or more furniture threading points. The first collinear alignment is parallel to the second collinear alignment.

In some embodiments, the cable may further comprise a cable slack having a sufficient slack configured to regulate extension of the plurality of drawers. In some embodiments at least one of the plurality of drawers may be configured to open to a full outward extension.

In some embodiments, one or more of the drawer threading points may comprise a hook coupled to a corresponding drawer. The hook may further comprise a spring-loaded gate.

In some embodiments, each of the drawer threading points and each of the one or more furniture threading points may be in vertical alignment relative to the furniture bottom side.

In some embodiments, the first collinear alignment comprises a horizontal offset from the second collinear alignment.

In some embodiments, the cable may further comprise a synthetic polymer sheath surrounding a synthetic fiber core.

In some embodiments, the drawer opening on each of the plurality of drawers forms a series of drawer opening pairs such that each of the furniture openings is disposed vertically between each of the drawer opening pairs. In other embodiments, the cable interlock system does not comprise a furniture opening between each drawer opening. In some embodiments, a drawer may comprise multiple threading points to regulate the amount of extension for that specific drawer.

In some embodiments, each of the drawer threading points and each of the furniture threading points are vertically aligned with each other relative to a bottom side of the furniture body.

In some embodiments, the drawer threading points form a collinear alignment when the drawers are all closed. The furniture threading points and the first and second anchor points also form a collinear alignment, wherein the collinear alignment of the drawer threading points and the collinear linear alignment of the furniture threading points and anchor points can be characterized as being parallel with each other.

In some embodiments, the plurality of drawers may form a single column wherein a single cable interlock system is configured to regulate extension of the drawers. In other embodiments, the plurality of drawers may form a plurality of columns wherein a plurality of independent cable interlock systems is configured to regulate the plurality of drawers with each of the plurality of columns comprising one of the independent cable interlock systems. In yet other embodiments, the plurality of drawers may form a plurality of columns wherein a single interlock system is configured to regulate the plurality of columns.

The cable interlock system may comprise an interlock release mechanism to either disengage one or more drawers from the cable interlock system or to increase the cable slack of the cable interlock system for opening of the one or more drawers during maintenance.

In one aspect, a method of installing the cable interlock system is disclosed. The steps may comprise, in a various orders: (i) installing a drawer opening to each of the plurality of drawers; (ii) installing one or more furniture openings to the furniture body; (iii) anchoring the cable first end to either one of the plurality of drawers or the furniture body creating the first anchor point; (iv) threading the cable second end through each of the drawer openings and furniture openings, thereby forming a drawer threading point with each drawer opening and a furniture threading point at each furniture opening; (v) anchoring the cable second end to the either one of the plurality of drawers or the furniture body creating the second anchor point; wherein the cable comprises a cable slack have sufficient slack to restrict drawer extension.

Manufacturing

Each of the components of the cable interlock system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiments

Now turning to the drawing, FIG. 1 shows a front view of a piece of furniture (120) having a cable interlock system (FIG. 2, 100) integrated therein in accordance with a first illustrated embodiment. The furniture comprises a furniture body (121), the furniture body having a furniture front side (122), a furniture back side (FIG. 2; 123) opposite the furniture front side, a first lateral side (124), a second lateral side (FIG. 2; 125) opposite the first lateral side, a top side (126), and a bottom side (127) opposite the top side. Installed inside the furniture body is a plurality of drawers (140), namely a first drawer (141), a second drawer (142), a third drawer (143), a fourth drawer (144), and a fifth drawer (145). The furniture body further comprises an exterior surface (129) and an interior surface (FIG. 2, 128) nested within the exterior surface. Without the cable interlock system, there is a possibility the furniture may tip over when two or more of the plurality of drawers are opened at the same time. This can cause serious injuries including death. The cable interlock system is configured to increase the tip over resistance of the furniture by limiting how many drawers can be extended at once.

Figure 2:
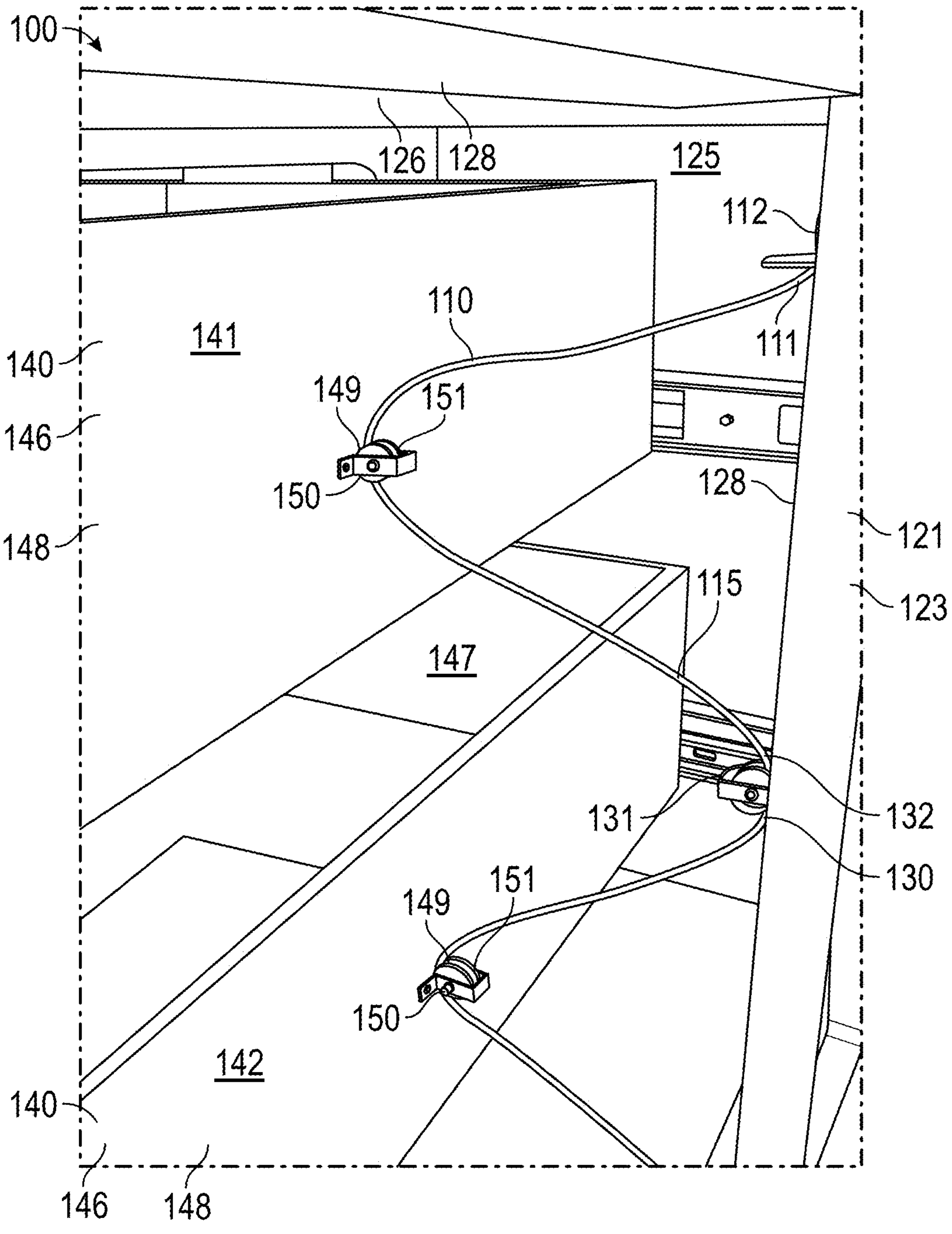
FIG. 2 shows a perspective view of the cable interlock system according to the first illustrated embodiment.
Figure 3:
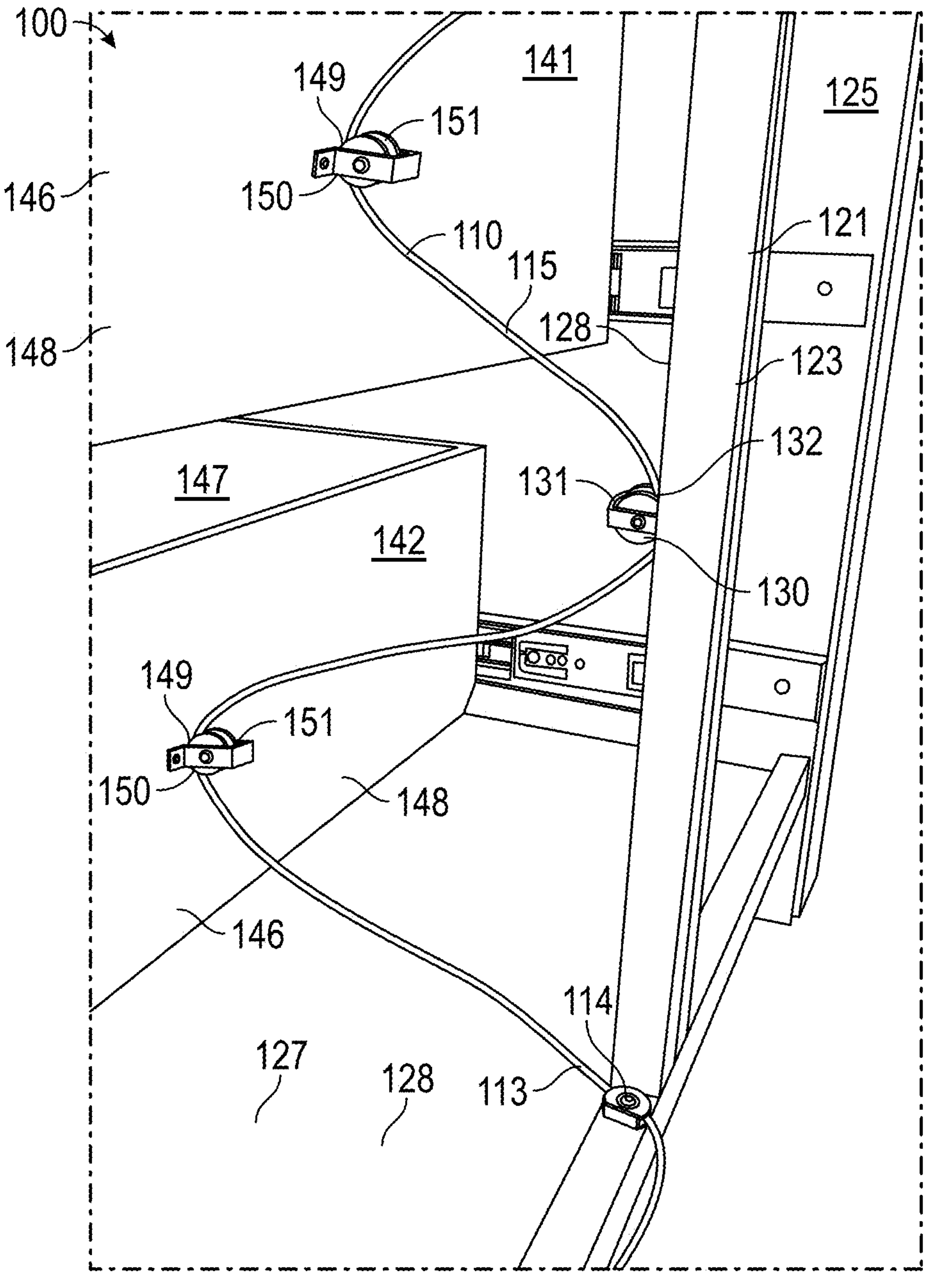
FIG. 3 shows an alternate perspective view of the cable interlock system according to the first illustrated embodiment.

FIGS. 2 and 3 show perspective views of the cable interlock system according to the first illustrated embodiment. The cable interlock system comprises a cable having a cable first end (111) and a cable second end (113) opposite the cable first end. The cable first end is secured to a furniture body (121) at a first anchor point (112). Likewise, the cable second end is secured to the furniture body at a second anchor point (114). Each of the plurality of drawers (140) comprises a plurality of walls including a drawer back side (148), drawer lateral sides (147), and a drawer bottom. At least one of the plurality of walls of each of the plurality of drawers comprises a drawer opening (150). Furthermore, the furniture body comprises multiple furniture openings (131). The cable is threaded through each of the drawer openings and each of the furniture openings. The cable threading through each of the drawer openings forms a drawer threading point (149). The cable threading through each of the furniture openings forms a furniture threading point (130).

The cable comprises a cable slack (115) that regulates drawer extensions for reasons including controlling the number of drawers that can be opened simultaneously, or extension amount of each drawer, as well as other purposes as can be appreciated by one having skill in the art. As shown, the cable interlock system (100) is used to prevent a certain number of drawers from fully extending at one time. In one embodiment, the cable slack comprises a sufficient slack so as to allow a single drawer of the plurality of drawers (140) to fully open while preventing two or more drawers of the plurality of drawers from fully opening. The prevention of any two drawers to be fully open at the same time causes one of the drawers to retract to allow the other one to open. For example, if the cable slack comprises sufficient slack to allow for 12 inches of drawer extension, the 12 inches of drawer extension can be consumed by a single drawer or multiple drawers. For example, the 12 inches of drawer extension could be consumed by one drawer fully extending to 12 inches, two drawers each extending 6 inches, six drawers each extending 2 inches, etc. Generally, once the cable slack is consumed, further extension of any drawer will cause an equivalent combined retraction of the other drawers. For example, in a three-drawer system, a 2-inch extension in one drawer will cause a 1-inch retraction to each of the other two drawers.

As shown, each of the drawer openings (150) comprises a bracket coupled to the drawer back side (148) of each of the plurality of drawers (140). In other embodiments, the drawer openings may be disposed on other portions of the drawer wall (146) including the drawer lateral side (147). In some embodiments, the drawer opening may comprise alternate structure which is similarly configured to receive threading from the cable (110). For example, and without limitation, the drawer opening may comprise two apertures on a drawer wall configured to allow the cable to thread through one aperture and out the other. In other embodiments, a combination of aperture and bracket may be utilized. One having skill in the art will appreciate various hardware and modifications to each of the plurality of drawers to achieve the drawer opening for the cable interlock system (100).

As shown, the furniture openings (131) are each coupled to the furniture body (121) at an interior surface (128) of the furniture back side (123). In other embodiments, each of the furniture openings may be disposed at other portions of the furniture body including the interior surface (128), the exterior surface (FIG. 4; 129), the top side (126), the bottom side (127), the furniture back side (123), the furniture front side (122), the first lateral side (124), the second lateral side (125), or a combination thereof. The furniture openings (140) are shown comprising brackets. Similar to the drawer opening (150), each furniture opening may comprise other openings configured to allow the cable (110) to be threaded therethrough. In some embodiments, the cable can weave in and out of a back panel of the furniture body and thereby be disposed on both the interior surface and the exterior surface.

In some embodiments, when one drawer is fully opened, the cable slack (115) will cause a previously opened drawer to fully close. In some embodiments, the cable slack comprises a sufficient slack such that while one of the plurality of drawers (140) is fully open, each remaining of the plurality of drawers is prevented from opening at all without causing the already fully opened drawer to retract.

The first anchor point (112) and the second anchor point (114) can be coupled to any portion of the furniture body (121) including the interior surface (128), the exterior surface (129), the first lateral side (124), the second lateral side (125), the top side (126), the bottom side (127), the furniture back side (123), the furniture front side (122), or a combination thereof. In some embodiments, the first anchor point and second anchor point are disposed on a drawer wall. As shown, the first and second anchor points are coupled to the interior surface at the furniture back side. The cable first end (111) and the cable second end (113) may comprise leftover overhang extending beyond the first anchor point and the second anchor point, respectively. The first anchor point is disposed vertically above each of the drawer threading points (149) and each of the furniture threading points (130) relative to the bottom side of the furniture body. Likewise, the second anchor point is disposed vertically below each of the drawer threading points and each of the furniture threading points relative to the bottom side. In other embodiments, the first and second anchor points comprise a same location on either the furniture body or drawer wall.

Generally, the cable (110) is low-elongation, low-friction, abrasion-resistant and has high break strength. Materials can include metals, thermoplastics, synthetic fibers, natural fibers, or any other material that can be appreciated with on having skill in the art. In some embodiments, the cable interlock system (100) may comprise a crank, spool, or other device installed to the interior surface (128) or the exterior surface (129) to regulate the amount of cable slack (115) in the cable and for making adjustments to the cable interlock system.

In some embodiments, the cable interlock system (100) does not comprise rollers. Instead, the cable (110) flows freely through each of the furniture threading points (130) and the drawer threading points (149). In some embodiments, the cable may comprise a synthetic fiber core and a synthetic polymer sheath. The synthetic fiber core has high tensile strength and durability. Examples of the synthetic fiber core can include aramid fibers like Kevlar, liquid crystal polymer fibers like Vectran, or a combination thereof. The synthetic polymer sheath has resistance to abrasion and low friction. Examples of the synthetic polymer sheath can include high tenacity polyester, ultra-high molecular weight polyethylene (UHMWPE), or a combination thereof. UHMWPE can include spectra or dyneema. Advantages of this cable structure with a synthetic fiber core and synthetic polymer sheath includes resistance to fatigue, kink, and abrasion. Cables comprising solely braided steel cable can show material fatigue and are may be insufficiently pliable Cables comprising solely the synthetic fibers can be undesirable due to eventual fraying under continuous use.

Figure 4:
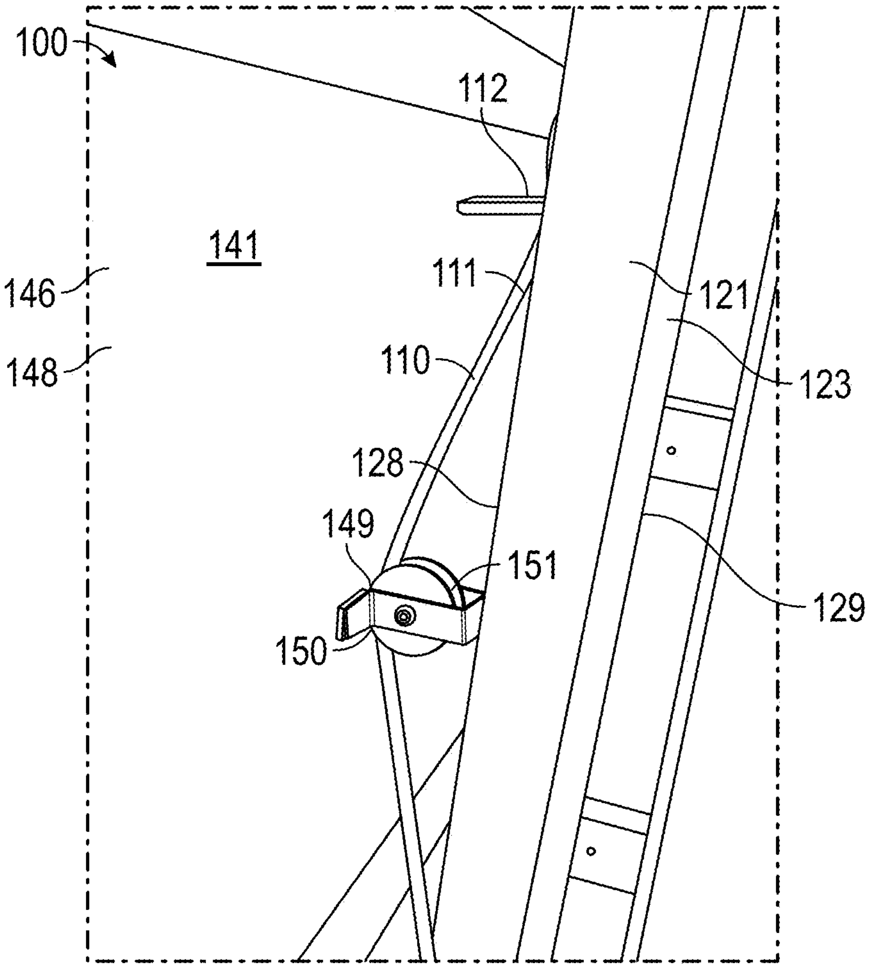
FIG. 4 shows a close-up view of the cable interlock system according to the first illustrated embodiment.

FIG. 4 shows a close-up view of the cable interlock system (100) according to the first illustrated embodiment. The cable interlock system further comprises a drawer wheel (151) coupled to each of the drawer openings (150) and a furniture wheel (132) coupled to each of the furniture openings (FIG. 5; 131) to aid in reducing friction to the cable (110) sliding through each of the drawer threading points (149) and furniture threading points (130). This can provide a smoother interaction between the drawers and the cable interlock system. In some embodiments, the cable interlock system does not comprise wheels. Other optional hardware may include springs, weights, and other components to assist in taking up the cable slack (FIG. 5; 115) and/or automatic closing of drawers. One having skill in the art will appreciate utilizing a variety of components without deviating from the disclosed invention.

Figure 5:
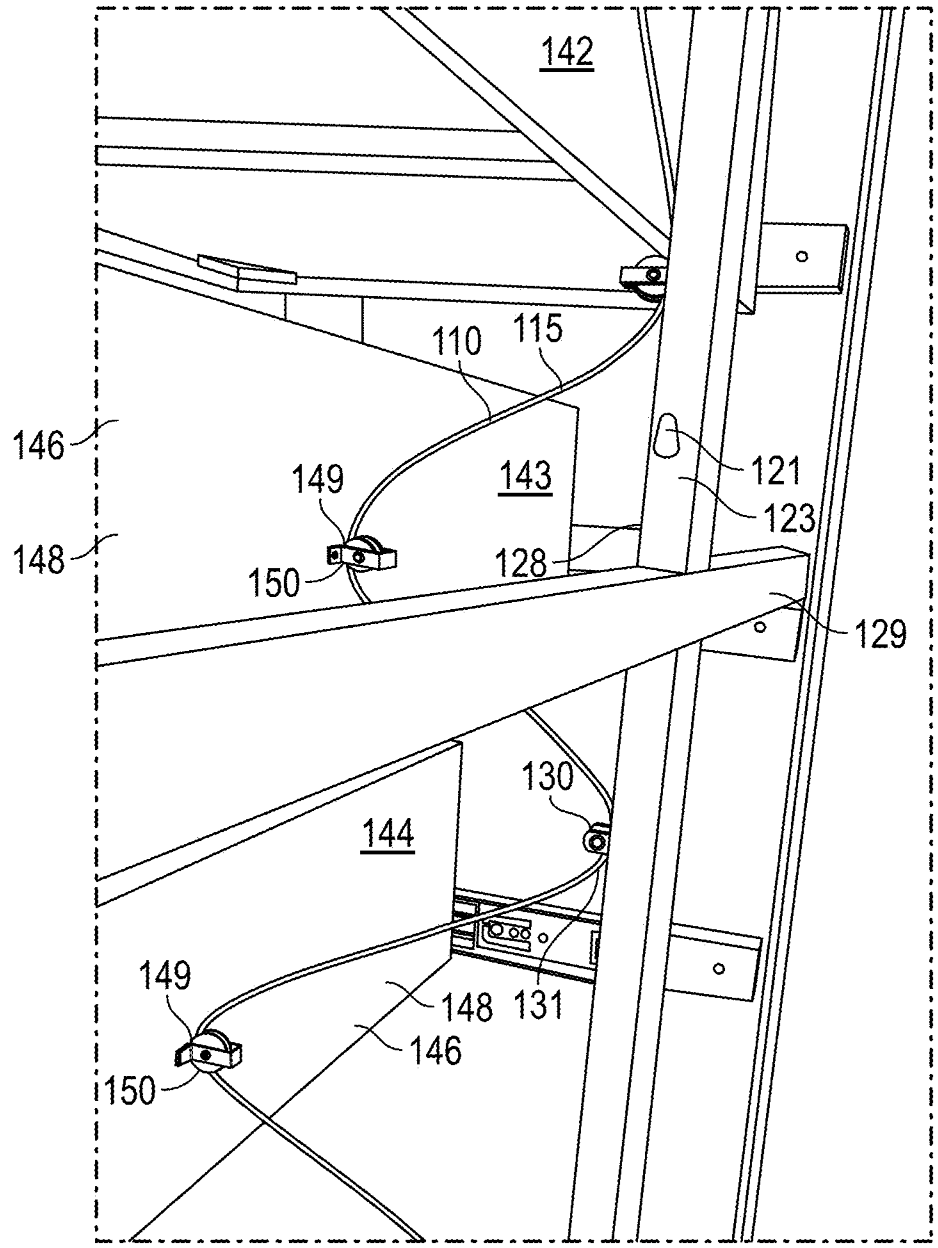
FIG. 5 shows a perspective view of the cable interlock system being in a slack state according to the first illustrated embodiment.
Figure 6:
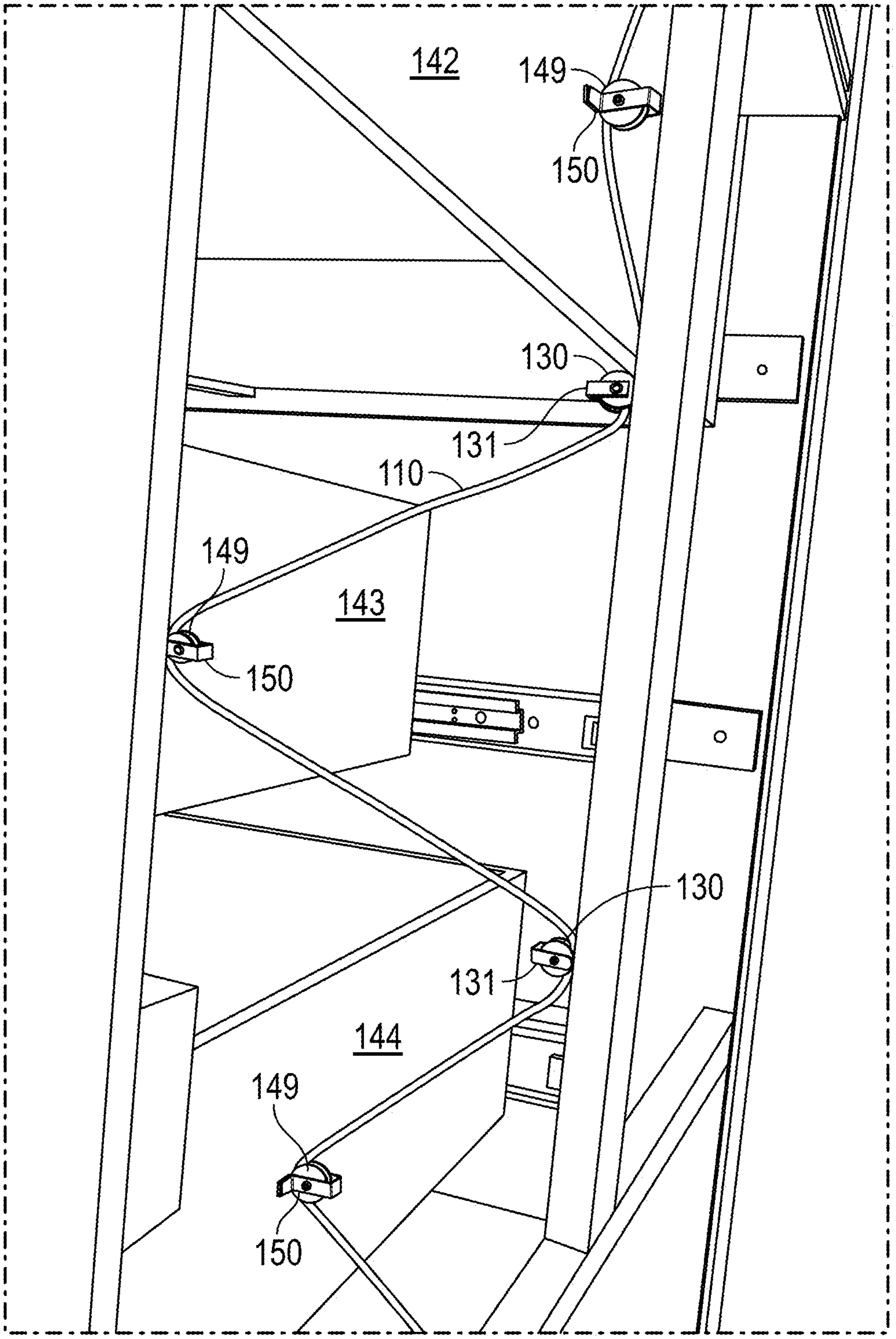
FIG. 6 shows a perspective view of the cable interlock system being in a taut state according to the first illustrated embodiment.

FIG. 5 and FIG. 6 show a perspective view of the cable interlock system (100) being in a slack state and a taut state, respectively. Comparison of the slack state of FIG. 5 and the taut state of FIG. 6 demonstrates the interaction between the cable interlock system and each of the plurality of drawers (140). During the slack state, the third drawer (143) and the fourth drawer (144) are each only partially opened such that the cable slack (115) of the cable (110) has not been fully consumed. The remaining cable slack can be consumed by extending of any of the plurality of drawers. While in the taut state, the third drawer has extended further and has removed the remaining cable slack from the cable. Because of the first and second anchor points (112; 114), and the non-stretchable material of the cable, none of the drawers can extend further without the cable retracting one or more of the drawers recreate the necessary cable slack.

Figure 7:
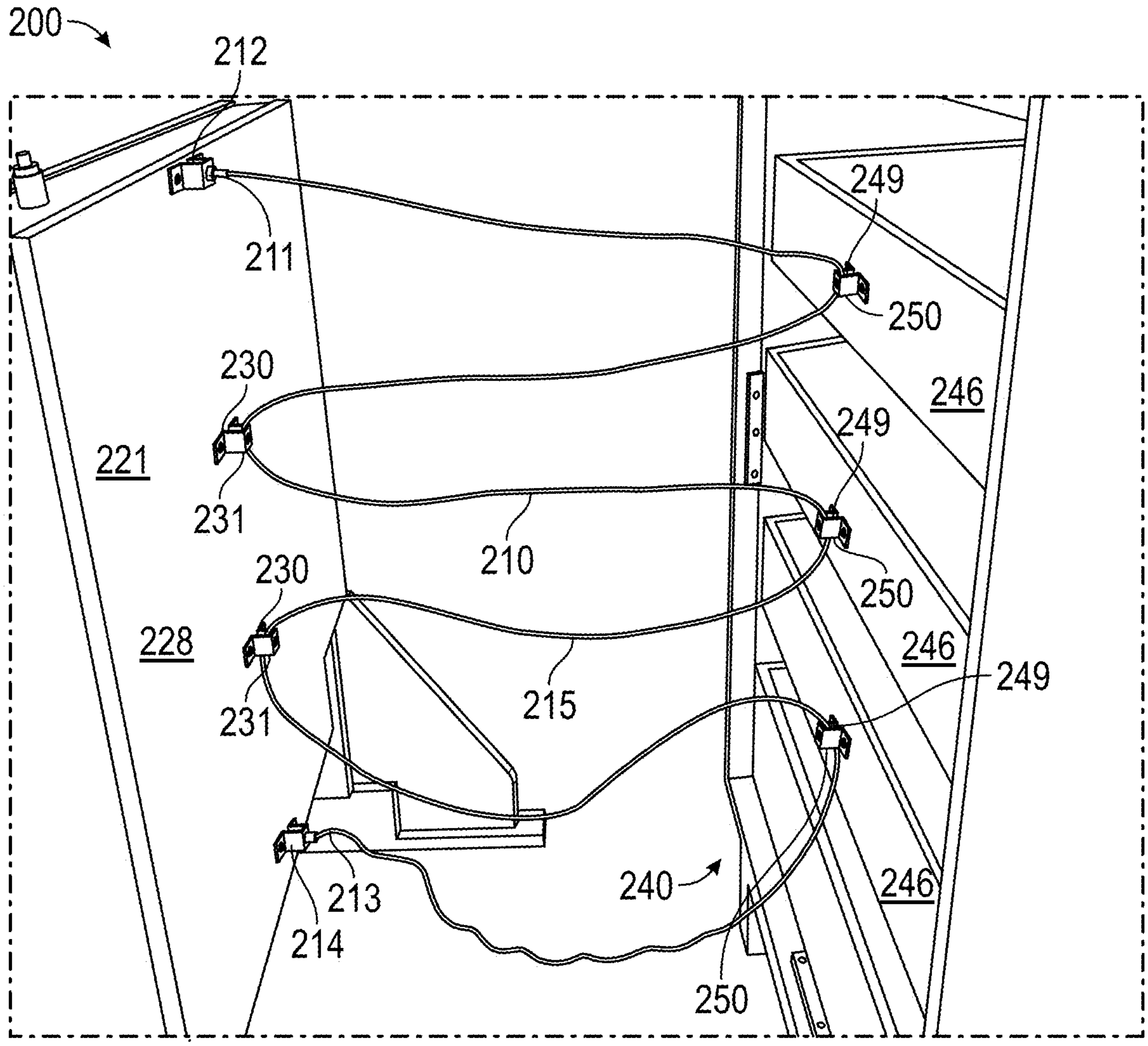
FIG. 7 shows an exploded side view of the cable interlock system in accordance with a second illustrated embodiment.

FIG. 7 shows an exploded side view of the cable interlock system (200) in accordance with a second illustrated embodiment. The cable interlock system does not comprise wheels as shown in the first illustrated embodiment. The cable interlock system comprises a drawer opening (250) disposed on a drawer wall (246) of each of the plurality of drawers. The cable interlock system further comprises one or more furniture openings (231) disposed on the furniture body. A cable (210) threads through each of the drawer openings to form a drawer threading point (249) and through each of the furniture openings to form a furniture threading point (230). The cable comprises a cable first end (211) and a cable second end (213) wherein the cable first end is anchored to the furniture body at a first anchor point (212) and the cable second end is anchored to the furniture body at a second anchor point (214). While each of the drawers are closed, the cable comprises a cable slack (215) configured to prevent two or more drawers from simultaneous full extension.

In some embodiments, each of the drawer threading points (249) and each of the furniture threading points (230) are vertically aligned with each other relative to the bottom side (227) of the furniture body (221). In some embodiments the drawer threading points form a collinear alignment when the drawers are all closed. In some embodiments, the furniture threading points and the first and second anchor points (212; 214) form a collinear alignment. In yet other embodiments, the collinear alignment of the drawer threading points and the collinear linear alignment of the furniture threading points/anchor points can be characterized as being parallel.

Figure 8:
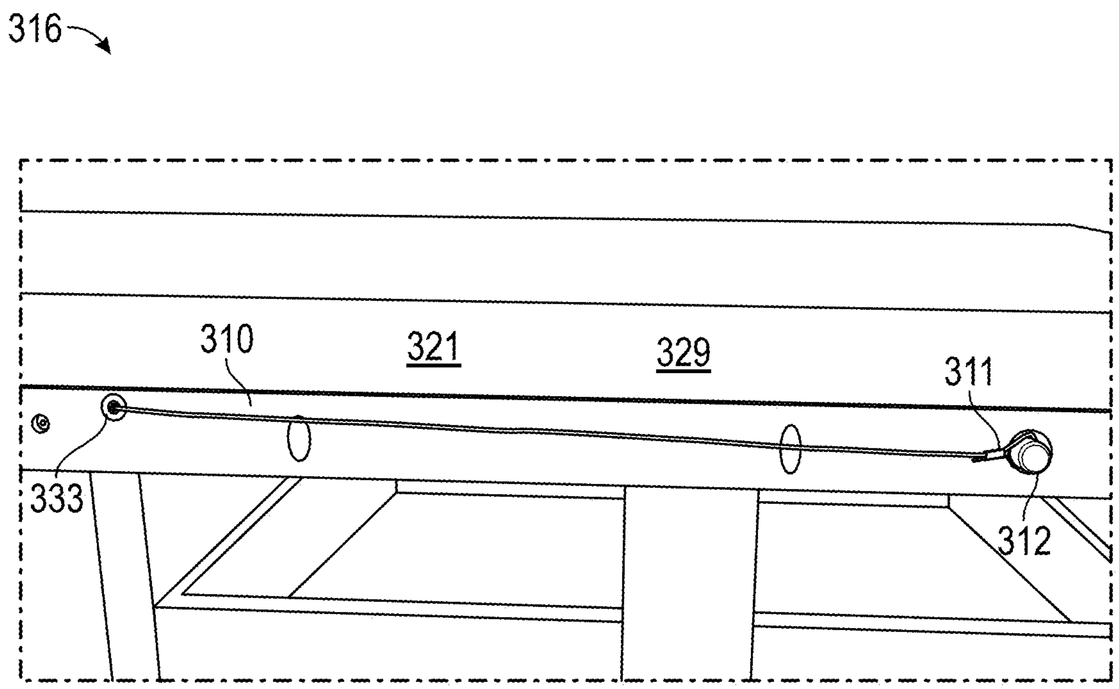
FIG. 8 shows a rear view of an exterior terminus of the cable interlock system in accordance with a third illustrated embodiment.

FIG. 8 shows a rear view of an exterior terminus (316) of the cable interlock system in accordance with a third illustrated embodiment. The exterior terminus is one embodiment of a drawer release system. The drawer release system allows for one or more of the plurality of drawers to disengage from the cable interlock system or to provide enough slack in the cable interlock system that the drawers can be opened beyond normal limits of the cable interlock system. The drawer release system can be included to the cable interlock system to allow a user to retrieve a lost clothing item or perform maintenance to the drawer slides.

The exterior terminus (316) comprises the cable (310) of the cable interlock system to extend out of the furniture body (321) through a grommet (333). A cable first end (311) of the cable is anchored to an exterior surface (329) of the furniture body by a fastener. The faster can be easily loosened to provide additional slack to the cable as a means for the drawer release system. After which the cable can be reattached to a first anchor point (312).

Other drawer release systems may also be utilized as can be appreciated by one having skill in the art. For example, the release of each drawer may be accessible inside or outside each drawer box such that each drawer can be individually disengaged from the cable interlock system without having to first fully disengage the cable interlock system. In another embodiment, the furniture may comprise a sliding door in the back panel for each access to the cable interlock system.

Figure 9:
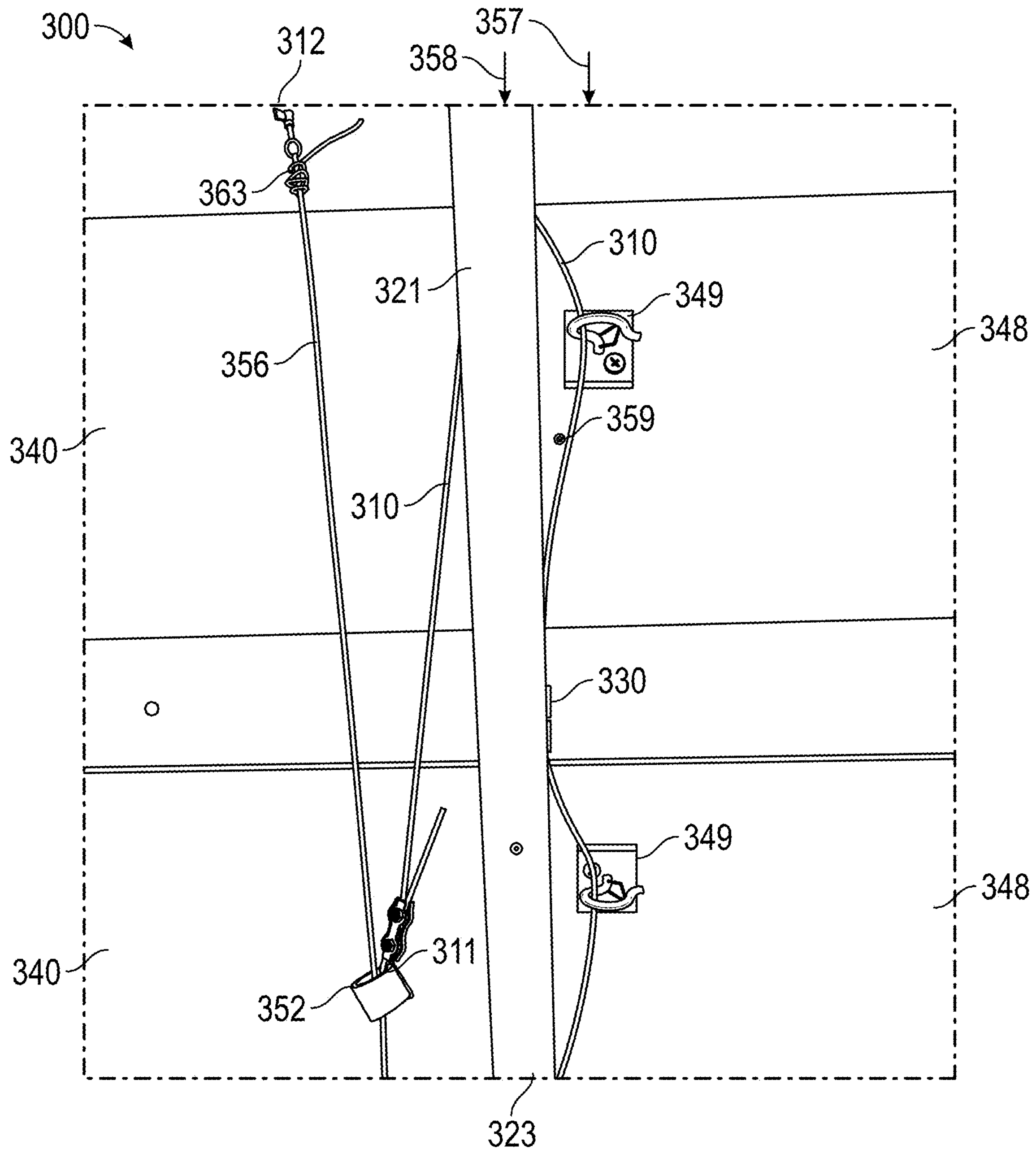
FIG. 9 shows interior view of the cable interlock system according to the third illustrated embodiment.

FIG. 9 shows interior view of the cable interlock system (300) according to the third illustrated embodiment. The cable interlock system comprises drawer threading points (349) coupled to a plurality of drawers (340) at a drawer backside (348). The cable interlock system further comprises a furniture threading point (330) coupled to a furniture body (321) at a furniture back side (323). The furniture threading point is positioned between the drawers to avoid contact with the drawer backsides when the drawers are fully closed. The drawer threading points form a collinear alignment characterized as a first collinear alignment (357). The furniture threading points and any anchor points disposed on the furniture back side also form a collinear alignment characterized as a second collinear alignment (358). The first collinear alignment is parallel to the second collinear alignment. The first collinear alignment further comprises a horizontal offset (359) in order for each of the drawer threading points to avoid contact with the furniture back side. By positioning the drawer threading points in the horizontal offset and the furniture threading points between the plurality of drawers, the plurality of drawers may comprise a greater drawer depth.

The cable interlock system (300) further comprises a cable weight (352) for purposes of cable management. When the plurality of drawers (340) is closed, slack in the cable (310) can cause undesirable twist and snag. The cable weight is coupled to the cable first end (311) wherein the cable weight creates tension with the cable and maintains any existing slack in a taut state which extends vertically along the furniture body. The cable weight translates vertically along a weight guide (356) which can include a second cable, rod, or the like. The weight guide prevents the cable weight from swinging and tangling within the system. Preferably, the cable weight should reach an obstacle, such as a guide terminal end (363) where the weight guide is anchored to the furniture body. In other embodiments, the obstacle can include a loop that the weight guide can travel but the weight cannot. The guide terminal end forms the first anchor point (312) of the system when the cable weight reaches the guide terminal end. The cable first end couples to the first anchor point which prevents further extension.

Figure 10B:
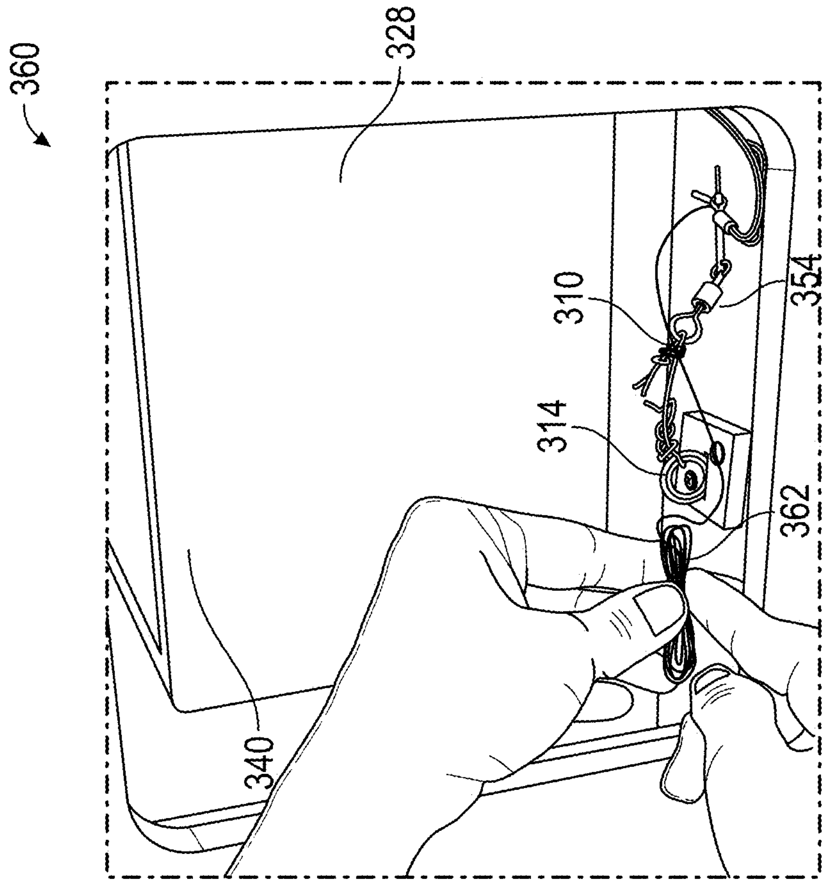
FIG. 10A-10B shows a cable release mechanism for the cable interlock system according to the third illustrated embodiment.
Figure 10A:
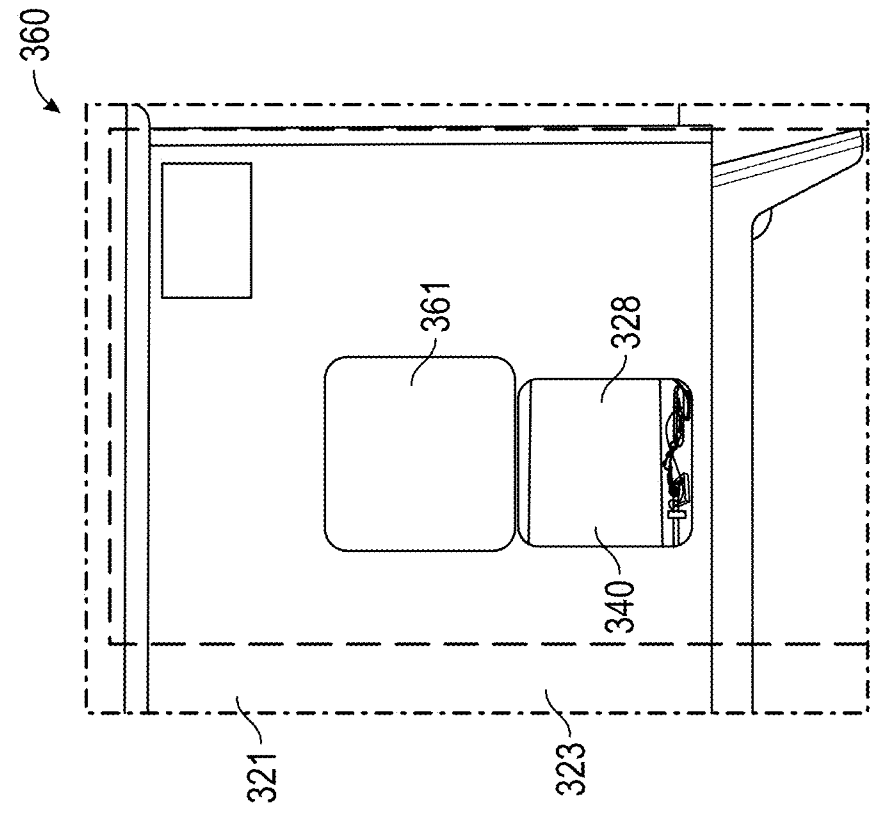

FIG. 10A-10B shows a cable release mechanism (360) releasing one or more drawers for the cable interlock system. The cable release mechanism comprises an interlock release cover (361) disposed on the furniture body (321) at the furniture back side (323). The interlock release cover provides access to an interior (328) of the furniture body. The cable (310) can be released from the anchor point (314) but is still attached to a leader cord (362) to create enough slack for removing a drawer. The cable further comprises smaller cables coupled together by an intermediate coupling (354) being a swivel. The intermediate coupling as shown prevents cord twist from negatively affecting performance of the cable interlock system. In other embodiments, the system may further comprise an intermediate coupling being a tensioning device to adjust tension. In some embodiments, the cable release mechanism may further comprise a snap or quick release between the cable and the anchor point to facilitate engaging or disengaging the interlock system. In one example, the quick release may comprise a bent wire having two hooks at either end configured to engage with each other.

Figure 11:
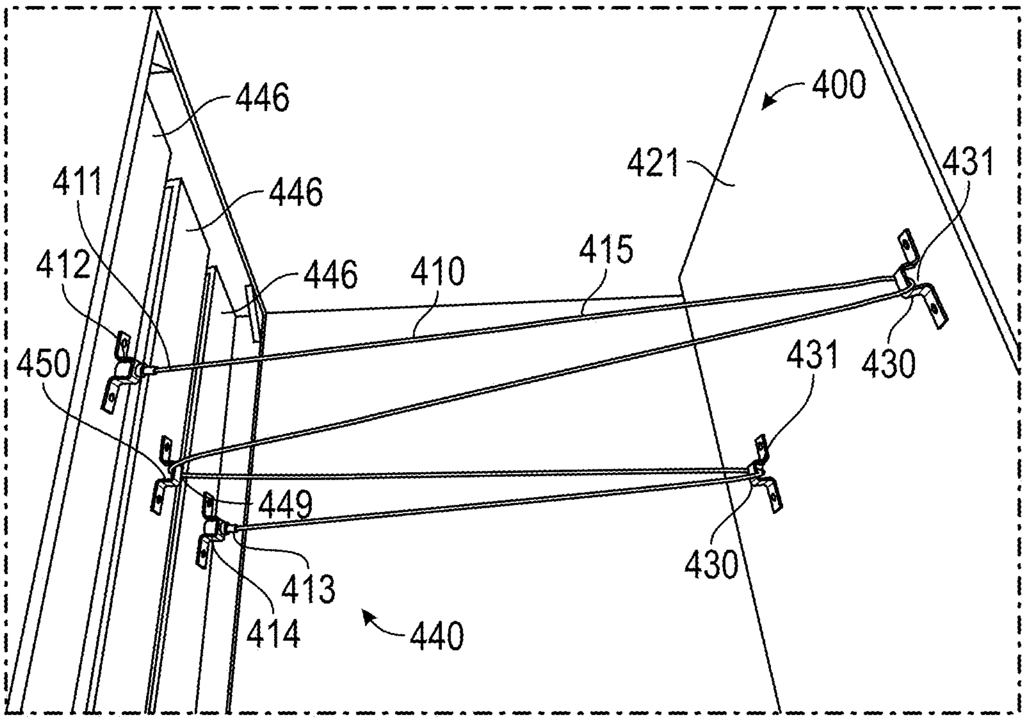
FIG. 11 shows an exploded perspective view of the cable interlock system in accordance with a fourth illustrated embodiment.

FIG. 11 shows an exploded perspective view of the cable interlock system (400) in accordance with a fourth illustrated embodiment. The cable interlock system comprises a cable (410) having a cable first end (411) and a cable second end (413). The cable first end is coupled to a drawer wall (446) of one of a plurality of drawers (440), thereby forming a first anchor point (412). The cable second end is coupled to the drawer wall of another of the plurality of drawers, thereby forming a second anchor point (414). A middle drawer comprises a drawer opening (450) wherein the cable extends through the drawer opening to establish a drawer threading point (449). Disposed across from the drawer threading opening and the first and second anchor points are multiple furniture openings (431) disposed on a furniture body (421), namely an interior surface of a back end of the furniture body. The cable also extends through each of the furniture openings to create a furniture threading point (430) at each threading. In this embodiment, the middle drawer is configured to extend half as much as other of the plurality of drawers.

FIG. 12A-D show vertical cross section views of various configurations of the cable interlock system (500) in accordance with various embodiments. In each of the configurations, the system comprises a plurality of drawers (540) that are received on a furniture front side (522) of a furniture body (521). Each of the drawers has a drawer threading point (549) on the drawer back side (548). Furthermore, in all configurations, at least one anchor point (512) is disposed on the interior surface (528) of the furniture back side (523), and a cable (510) is coupled to the anchor point. Note that some reference numbers may be omitted to provide clarity to the illustrations.

Figure 12C:
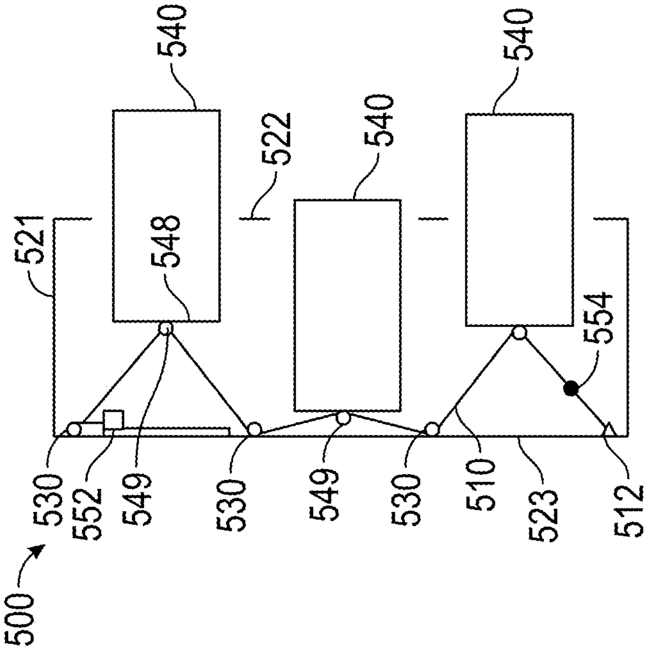
FIG. 12A-D show vertical cross-section views of various configurations of the cable interlock system in accordance with various embodiments.
Figure 12D:
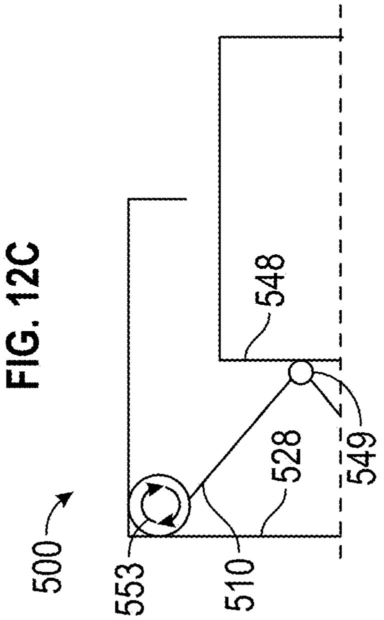
Figure 12A:
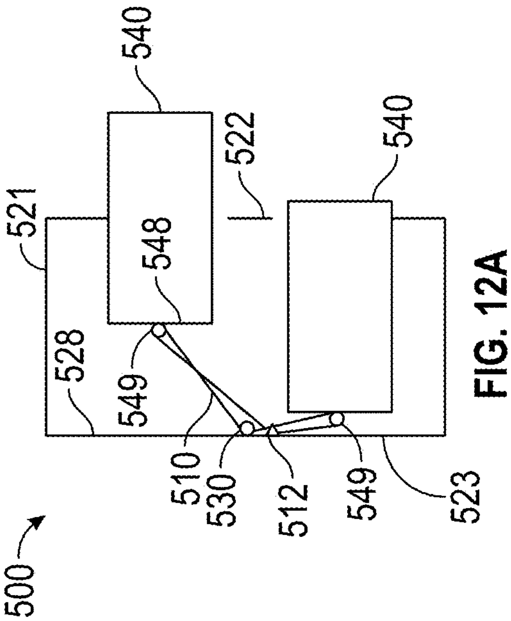
Figure 12B:
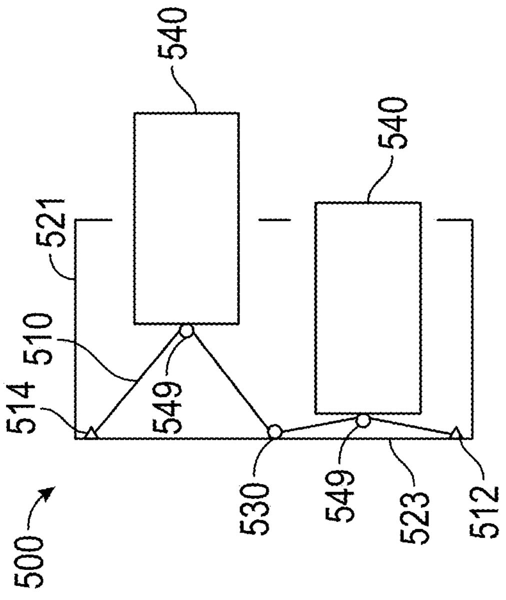

In the first configuration of FIG. 12A, there are two drawers (540) and a single furniture threading point (530). The cable (510) is passed from the anchor point (512), firstly through a drawer threading point (549), secondly through the furniture threading point, thirdly through another drawer threading point, and finally coupled to the anchor point. This alternating sequence and configuration, when combined with an appropriate length for the cable, limits the total lateral movement of the drawers such that when one is pulled away from the interior surface (528) at the furniture back side (523) of the furniture body (521), the other is pulled toward it. When the drawers are loaded with heavy items, the center of gravity of the system tends to remain within the furniture's footprint, thereby reducing the risk of tipping.

In the first configuration, the cable may cross over itself in an unwanted manner, potentially leading to tangling or wear and tear. This can be at least partially solved by the second configuration of FIG. 12B, wherein a second anchor point (514) is introduced. The cable is coupled to the first anchor point (512) and, alternatively passes through the drawer threading points (549) and furniture threading point (530), similar to the first configuration, and is finally coupled to the second anchor point instead of the first, allowing more room for free movement of the cable.

The allowable extension of drawers in a particular furniture determines total cable slack available in the system. However, increased slack increases the chances of snags and tangles. Additionally, the slack in a system can create an irregular feel when opening different drawers. Slack can accumulate adjacent to one or more drawers such that when one drawer is opened no resistance is felt while opening another drawer the slack can be felt moving to a different part of the system. In the third configuration of FIG. 12C, there are three drawers (540) with three drawer threading points (549). In order to achieve the alternating pattern for the cable interlock system, two furniture threading points (530) are needed. The cable is passed from the first anchor point (512) through an alternating sequence of threading points, and then, instead of being coupled to an anchor point, is passed through a third furniture threading point and then coupled to a cable weight (552). The cable weight may be further guided along a track or tube to prevent swinging. Altogether, this configuration allows the cable to move freely within a large range, while remaining somewhat taut, thereby reducing the risk of tangling when compared to using fixed anchor points.

As the number of drawers and threading points increase, or when a cable weight is used such as in FIG. 12C, there may also be an increased risk of the cable (510) twisting axially over time. A larger system can also make the maintenance process more complicated. To solve both of these problems, it may be desirable for the cable to comprise smaller cables with intermediate couplings (554), such as swivels or tensioners. Such couplings can reduce unwanted strain and improve case of assembly. Other methods for cable management and coupling can be utilized as can be appreciated by one having skill in the art.

In the fourth configuration of FIG. 12D, a truncated portion of the cross section is shown. This configuration is similar to the third configuration, except that, instead of a hanging weight, the cable (518) is finally coupled to a spring-loaded cable retracting reel (553) disposed on the interior surface (528) of the furniture. This would further reduce unwanted movement in the cable, but may introduce other considerations like repairability or balancing the spring force with the user's expectation for the drawer's motion.

Figure 13B:
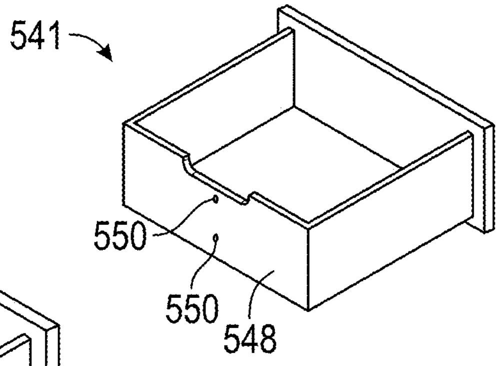
FIG. 13A-C show perspective views of various configurations of drawer threading points in accordance with various embodiments.
Figure 13A:
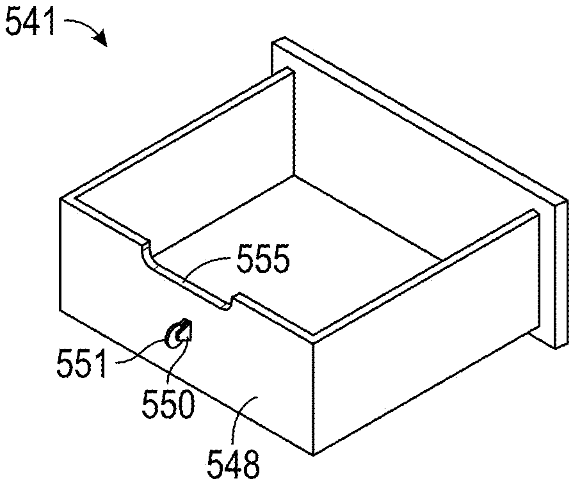
Figure 13C:
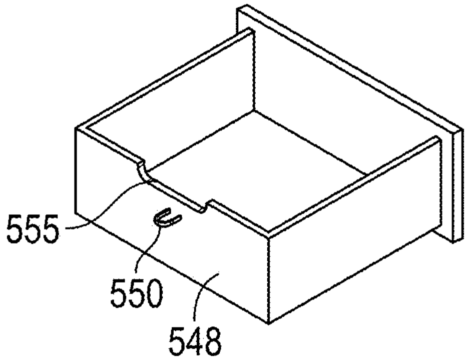

FIG. 13A-C show perspective views of various configurations of drawers and drawer threading points. In each of the configurations, a drawer (541) comprises a drawer back side (548) having an access cutout (555). Additionally, each configuration has a drawer threading point, which can comprise one or more openings or fixtures, as described by the various configurations.

In FIG. 13A, a drawer wheel (551) is coupled to the drawer back side (548) via drawer openings (550) which comprise threaded inserts (not shown). Altogether, these form a drawer threading point through which a cable can be passed. In FIG. 13B, no fixture is used. The drawer threading point comprises two drawer openings (550) in the drawer back side (548), wherein a cable may be passed in one and out the other to form a drawer threading point.

In FIG. 13C, the drawer back side (548) comprises an extension that forms a drawer opening (550). In this configuration, the drawer opening may comprise a shaped, flexible material or be coupled to a spring-loaded gate to form a drawer threading point that can be unhooked from the cable with case. Combined with the access cutout (555), this configuration allows for a drawer to be individually disengaged without further disassembly. Other methods for cable threading and motion (e.g. eyelets, hooks, tracks, or gears) can be utilized as can be appreciated by one having skill in the art. In some embodiments, the access cutout may not be present and only an interlock release mechanism comprising the spring-loaded gate is used. A benefit can include a user disengaging a drawer threaded point from the cable interlock system without having to fully disengage the entire cable interlock system.

Figure 14A:
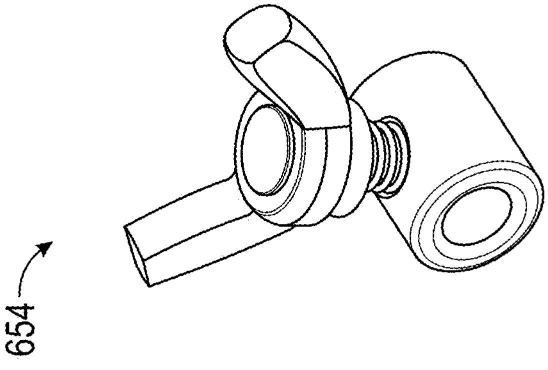
FIG. 14A-C shows various embodiments of intermediate couplings.
Figure 14B:
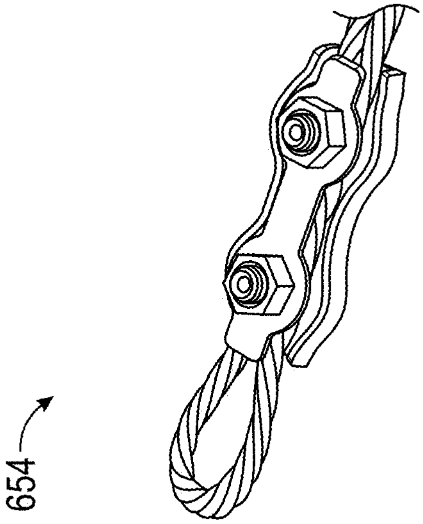
Figure 14C:
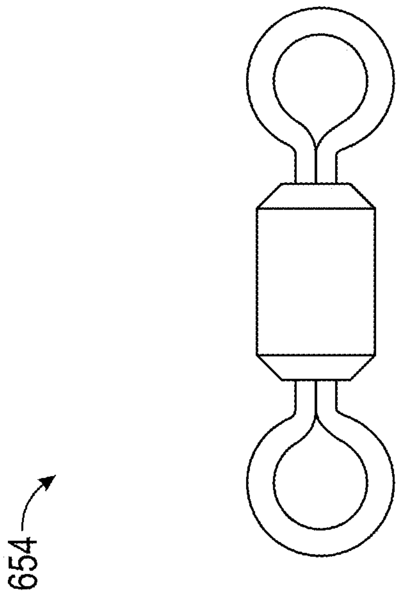

FIG. 14A-14C show various intermediate couplings (654) used with embodiments of the invention. The intermediate couplings as shown as cable tensioners. The intermediate couplings reduce human error related to securing the cable with knots. The intermediate couplings allow for precise adjustment of length of the cable at both production and during maintenance of the system.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST cable interlock system (100; 200; 300; 400; 500)
cable (110; 210; 310; 410; 510)
cable first end (111; 211; 311; 411)
first anchor point (112; 212; 312; 412; 512)
cable second end (113; 213; 313; 413)
second anchor point (114; 214; 314; 414; 514)
cable slack (115; 215)

furniture (120)
furniture body (121; 221; 321; 421; 521)
furniture front side (122; 522)
furniture back side (123; 323; 523)
first lateral side (124)
second lateral side (125)
top side (126)
bottom side (127; 227)
interior surface (128; 328; 528)
exterior surface (129; 329)
furniture threading point (130; 230; 330; 430; 530)
furniture opening (131; 231; 431)
furniture wheel (132)
plurality of drawers (140; 340; 440; 540)
drawer (141; 541)
second drawer (142)
third drawer (143)
fourth drawer (144)
fifth drawer (145)
drawer wall (146; 246; 446)
drawer lateral side (147)
drawer back side (148; 348; 548)
drawer threading point (149; 249; 349; 449; 549)
drawer opening (150; 250; 450; 550)
drawer wheel (151; 551)
exterior terminus (316)
grommet (333)
weight guide (356)
first collinear alignment (357)
second collinear alignment (358)
horizontal offset (359)
interlock release mechanism (360)
interlock release cover (361)
leader cord (362)
guide terminal end (363)
cable weight (352; 552)
cable retracting reel (553)
intermediate coupling (354; 554; 654)
access cutout (555)

What is claimed is:

1. A cable interlock system, comprising:
- a plurality of drawers, each of the plurality of drawers comprises a drawer back side and a drawer front side opposite the drawer back side, wherein each of the plurality of drawers comprises a drawer threading point at the drawer back side;
- a furniture body comprising:
  - a furniture front side, a furniture back side opposite the furniture front side, a furniture top side, a furniture bottom side opposite the furniture top side, and a furniture interior,
  - a first anchor point disposed on the furniture interior at the furniture back side,
  - a second anchor point disposed on the furniture interior at the furniture back side,
  - one or more furniture threading points disposed on the furniture interior, and
  - a plurality of furniture apertures disposed on the furniture front side configured to receive the plurality of drawers,
  - wherein the first anchor point is disposed vertically below each of the drawer threading points and each of the one or more furniture threading points;
- a cable having a cable first end and a cable second end, wherein the cable first end is coupled to the first anchor point, the cable second end is configured to couple to the second anchor point, and the cable is configured to extend through each of the drawer threading points and the one or more furniture threading points; and
- a cable weight coupled to the cable second end, wherein the cable weight translates along a weight guide, the weight guide comprising a first guide terminal end and a second guide terminal end both coupled to the furniture interior, wherein the first guide terminal end is disposed vertically above each of the drawer threading points and each of the one or more furniture threading points, and further wherein the weight guide extends through the cable weight.

2. The cable interlock system of claim 1, the cable further comprising a cable slack having a sufficient slack configured to regulate extension of the plurality of drawers.

3. The cable interlock system of claim 1, wherein each of the drawer threading points and each of the one or more furniture threading points are in vertical alignment relative to the furniture bottom side.

4. The cable interlock system of claim 1, wherein the first guide terminal end is anchored in the furniture interior at the furniture top side.

5. The cable interlock system of claim 1, wherein the first guide terminal end comprises the second anchor point.

6. The cable interlock system of claim 1, wherein the cable weight is configured to surround a section of the weight guide.

7. The cable interlock system of claim 1, wherein the weight guide is a second cable or a rod.

8. A cable interlock system, comprising:
- a plurality of drawers, each of the plurality of drawers comprises a drawer back side and a drawer front side opposite the drawer back side, wherein one or more of the plurality of drawers comprises a drawer threading point;
- a furniture body comprising:
  - a furniture front side, a furniture back side opposite the furniture front side, a furniture top side, a furniture bottom side opposite the furniture top side, and a furniture interior,
  - one or more furniture threading points disposed on the furniture interior, and
  - a plurality of furniture apertures disposed on the furniture front side configured to receive the plurality of drawers;
- a first anchor point disposed on the furniture interior;
- a second anchor point dispose on the furniture interior;
- a cable having a cable first end and a cable second end, wherein the cable first end is coupled to the first anchor point, the cable second end is configured to couple to the second anchor point, and the cable is configured to extend through each of the drawer threading points and the one or more furniture threading points; and
- a cable weight coupled to the cable second end, wherein the cable weight translates along a weight guide, wherein the weight guide extends through the cable weight.

9. The cable interlock system of claim 8, wherein each of the plurality of drawers comprises the drawer threading point.

10. The cable interlock system of claim 8, wherein one or more of the drawer threading points comprises a hook having s spring-loaded gate coupled to a corresponding drawer.

11. The cable interlock system of claim 8, wherein each of the one or more drawer threading points is disposed on the drawer back side.

12. The cable interlock system of claim 8, wherein the cable comprises a plurality of smaller cables connected in a series using intermediate couplings for preventing twist in said cable.

13. The cable interlock system of claim 8, the cable further comprising a synthetic polymer sheath surrounding a synthetic fiber core.

14. The cable interlock system of claim 8, further comprising an interlock release mechanism having an interlock release cover disposed at the furniture back side, the interlock release cover configured to provide access to the furniture interior.

15. The cable interlock system of claim 14, further comprising a leader cord attached to the cable to create sufficient cable slack to remove one of the plurality of drawers.

16. The cable interlock system of claim 8, wherein the weight guide further comprises a first guide terminal end and a second guide terminal end both coupled to the furniture interior, wherein the first guide terminal end is disposed vertically above each of the drawer threading points and each of the one or more furniture threading points.

17. The cable interlock system of claim 16, wherein the first guide terminal end is anchored in the furniture interior at the furniture top side.

18. The cable interlock system of claim 16, wherein the first guide terminal end comprises the second anchor point.

19. The cable interlock system of claim 8, wherein the cable weight is configured to surround a section of the weight guide.

20. The cable interlock system of claim 8, wherein the weight guide is a second cable or a rod.

* * * * *